(12) United States Patent
Huomo

(10) Patent No.: US 8,926,437 B2
(45) Date of Patent: Jan. 6, 2015

(54) DEVICE AND SYSTEM FOR PLAYING A GAME AND A METHOD FOR CONTROLLING A GAME

(75) Inventor: Miikka Huomo, Vantaa (FI)

(73) Assignee: Nokia Corporation, Espoo (FI)

( * ) Notice: Subject to any disclaimer, the term of this patent is extended or adjusted under 35 U.S.C. 154(b) by 1482 days.

(21) Appl. No.: 10/568,296

(22) PCT Filed: Jul. 10, 2004

(86) PCT No.: PCT/IB2004/002521
§ 371 (c)(1),
(2), (4) Date: Feb. 14, 2006

(87) PCT Pub. No.: WO2006/008573
PCT Pub. Date: Jan. 26, 2006

(65) Prior Publication Data
US 2007/0155505 A1    Jul. 5, 2007

(51) Int. Cl.
*A63F 13/02* (2006.01)
*H04M 1/725* (2006.01)
*A63F 13/00* (2014.01)
*A63F 13/40* (2014.01)
*A63F 13/30* (2014.01)

(52) U.S. Cl.
CPC ............ *H04M 1/7253* (2013.01); *A63F 13/00* (2013.01); *A63F 13/10* (2013.01); *A63F 13/12* (2013.01); *A63F 2300/204* (2013.01); *A63F 2300/208* (2013.01); *A63F 2300/405* (2013.01); *A63F 2300/406* (2013.01); *A63F 2300/609* (2013.01); *H04M 1/72544* (2013.01)
USPC ......... 463/43; 463/1; 463/42; 463/44; 463/47

(58) Field of Classification Search
CPC ... A63F 13/00; A63F 13/02; A63F 2300/204; A63F 2300/208; A63F 2300/609
USPC .............................. 463/1, 43–45, 47
See application file for complete search history.

(56) References Cited

U.S. PATENT DOCUMENTS

| 6,290,565 | B1 * | 9/2001 | Galyean, III et al. ........... 446/99 |
| 6,877,096 | B1 * | 4/2005 | Chung et al. .................. 713/185 |
| 7,445,550 | B2 * | 11/2008 | Barney et al. .................. 463/37 |
| 2002/0028704 | A1 * | 3/2002 | Bloomfield et al. ............. 463/1 |

(Continued)

FOREIGN PATENT DOCUMENTS

WO    WO 03/032880 A2    4/2003
WO    WO 2004/019175 A2    3/2004

OTHER PUBLICATIONS

Final Fantasy game manual, pp. 1-79, release date Jul. 12, 1990.*

(Continued)

*Primary Examiner* — Jasson Yoo
(74) *Attorney, Agent, or Firm* — Ditthavong & Steiner, PC

(57) ABSTRACT

A gaming device for playing a game including one or more parameters that affect a user's participation in the game, the gaming device including a memory storing a data structure that associates each one of a plurality of device configurations with a respective game configuration, wherein each game configuration differently specifies one or more parameters of the game; means for identifying the current device configuration for the device; means for using the data structure to determine a current game configuration associated with the current device configuration; and means for controlling the game by setting parameters in the game as specified by the current game configuration.

18 Claims, 3 Drawing Sheets

(56) References Cited

U.S. PATENT DOCUMENTS

| | | | |
|---|---|---|---|
| 2002/0125318 A1* | 9/2002 | Tatsuta et al. | 235/454 |
| 2003/0134679 A1* | 7/2003 | Siegel et al. | 463/43 |
| 2003/0144022 A1 | 7/2003 | Hatch | 455/550 |
| 2003/0171147 A1 | 9/2003 | Sinclair et al. | 463/39 |

OTHER PUBLICATIONS

Dark Age of Camelot Shines by Royce Brainard, http://www.gameindustry.com/review/item.asp?id=288, (Jun. 30, 2004 edition), pp. 1-5.*

European Communication for related European Application No. 04744170.4 dated Jun. 11, 2012, pp. 1-5.

* cited by examiner

DEVICE AND SYSTEM FOR PLAYING A GAME AND A METHOD FOR CONTROLLING A GAME

FIELD OF THE INVENTION

Embodiments of the present invention relate to a device and system for playing a game and a method for controlling a game. In particular embodiments of the present invention relate to a device and system for playing a game and a method for controlling a game in the field of mobile telecommunications.

BACKGROUND TO THE INVENTION

It is now common for mobile cellular telephones to have games that are embedded in the system software. These games are bundled with the mobile telephone when it is sold.

It has recently become possible to download games to a mobile cellular telephone over the air (or by any other means). This allows a mobile cellular telephone to be reprogrammed with a new game.

The downloading of games over the air allows a user of a mobile telephone to customize his or her mobile telephone so that it has his or her favorite games.

It is now also possible to play multi-user games via a mobile cellular telephone. The user of the mobile telephone typically logs onto a remote server to play the game with other people who have logged on either through their own mobile telephones or, for example, via the Internet. Another user of a mobile telephone may, for example, form a local ad-hoc network with other local wireless gaming devices, using for example BLUETOOTH technology.

It is also common practice for users of mobile cellular telephones to update their telephones regularly either by buying a new telephone or by buying accessories that augment the functionality of their existing telephone.

It would be desirable to marry the trends for updating telephones with the trend for mobile gaming to create a new gaming experience.

BRIEF DESCRIPTION OF THE INVENTION

According to one embodiment of the invention there is provided a gaming device for playing a game including one or more parameters that affect a user's participation in the game, the gaming device comprising: a memory storing a data structure that associates each one of a plurality of device configurations with a respective game configuration, wherein each game configuration differently specifies one or more parameters of the game; means for identifying the current device configuration for the device; means for using the data structure to determine a current game configuration associated with the current device configuration; and means for controlling the game by setting parameters in the game as specified by the current game configuration.

According to another embodiment of the invention there is provided a method of controlling a game played by a user, wherein the game comprises one or more parameters that affect a user's participation in the game, the method comprising: associating each one of a plurality of device configurations with a respective game configuration, wherein each game configuration differently specifies one or more parameters of the game; identifying the current device configuration for a device; determining a current game configuration using the current device configuration; and controlling the current game by setting parameters of the game as specified by the current game configuration.

According to another embodiment of the invention there is provided a gaming system for playing a game including one or more parameters that affect a user's participation in the game, the gaming system comprising: a client device comprising means for identifying the current device configuration of the client device; and a server comprising: a memory storing a data structure that associates each one of a plurality of device configurations with a respective game configuration, wherein each game configuration differently specifies one or more parameters of the game; means for using the data-structure to determine a current game configuration associated with a current device configuration; and means for controlling the game by setting parameters in the game as specified by the current game configuration, wherein the client device additionally comprises means for transmitting the current device configuration to the server and the server additionally comprises means for receiving the current device configuration transmitted from the client device.

According to another embodiment of the invention there is provided a server, for controlling a game, comprising: a memory storing a data structure that associates each one of a plurality of device configurations with a respective game configuration, wherein each game configuration differently specifies one or more parameters of the game; means for receiving a current device configuration from a client device; means for using the data structure to determine a current game configuration associated with the received current device configuration; and means for controlling the game by setting parameters in the game as specified by the current game configuration.

According to another embodiment of the invention there is provided a client device, for playing a game and communicating with a server, comprising: means for transmitting to the server information identifying a configuration of the client device

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
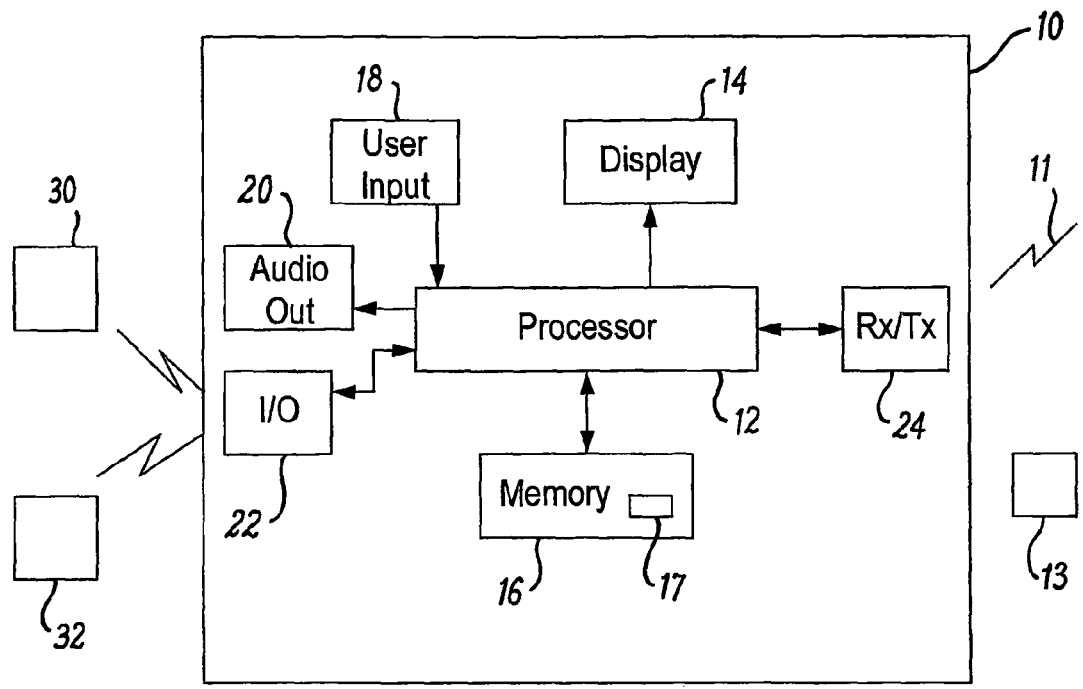
FIG. 1 illustrates a gaming device.

FIG. 1 illustrates a hand-portable electronic device 10 comprising: a processor 12, a display 14, a memory 16, a user input device 18, an audio output device 20 and an input/output interface 22. The illustrated hand-portable electronic device 10 in this example is a mobile cellular telephone and further comprises a cellular radio transceiver 24.

The processor 12 is connected in two-way communication with the memory 16, the input/output interface and the radio cellular transceiver 24. It is also connected to provide command signals to the display 14 and the audio output device 20 and to receive input signals from the user input device 18. It should be appreciated that the electronic device 10 may comprise further functional elements and that the processor 12 may be comprised of a plurality of processor units.

The memory 16 stores computer program instructions that control the operation of the electronic device 10 when loaded into the processor 12. Memory 16 may be an extended memory chip etc. The memory 16 includes computer program instructions for a game, which when loaded into the processor 12 enable a user to interact with the device 10 and play the game. As a consequence, the device 10 may be referred to as a gaming device.

The user may interact with the device via the display 14 and user input device 18 and, optionally, the audio output device 20.

The computer program instructions may arrive at the device 10 via an electromagnetic carrier signal 11 or be copied from a physical entity 13 such as a computer program product, a memory device or a record medium such as a CD-ROM or DVD.

The input/output interface 22 may be any suitable type of interface. It may for example comprise a low power radio frequency transceiver and communicate using e.g. the Bluetooth® protocol, or another wireless connection such as infrared, GSM/GPRS/UMTS, WLAN etc. It may also or alternatively include a galvanic interface such as a USB interface. The input/output interface augments the functionality of the electronic device 10 by communicating with accessory devices 30, 32.

The gaming device 10 enables a user to play any suitable type of game for which computer program instructions are stored in the memory 16. Examples of games include but are not limited to first person perspective games, role playing games, board games and arcade games.

It is possible to pause game playing in some games. For such a game, a game instantiation starts at the beginning of a game and ends when the game concludes and a session is a period during which a game is played until a pause or a conclusion.

In embodiments of the invention, parameters of the game are dependent upon the configuration of the device 10 which depends upon the nature of the device 10 and the nature of the accessory devices 30, 32 communicating with it.

The game may, for example, comprise one or more "user gaming objects". A "user gaming object" is an object within the game that is apparent to the users of the game and which participates in the game play in a manner controlled by a user. It would for example be a character in a role playing game. Each user gaming object may have one or more attributes. An "attribute" is a characteristic of the user gaming object that affects its participation in a game. Examples of attributes for a character in a role playing game may include, for example, strength, speed, stamina, regeneration, resistance etc. The parameters of the game may include one or more parameters that specify an attribute or attributes of a user gaming object in the game.

The game may, for example, also comprise one or more "gaming objects". A "gaming object" is an object within the game that is apparent to the users of the game and which participates in the game play. It would for example be an object carried by a character in a role playing game. Each gaming object may have one or more attributes. An "attribute" is a characteristic of an object that affects the game. The attribute may affect the gaming object's participation in the game. For example, if the gaming object were a weapon in a role playing game, its attributes may include the weapon's strength and range. The attribute may alternatively affect a user gaming object's participation in the game. For example, if the gaming object were an amulet in a role playing game, its attributes may, for example, include invisibility for the user gaming object carrying it.

The parameters of the game may include a parameter or parameters that introduce one or more gaming objects into the game. The parameters of the game may also include a parameter or parameters that specify an attribute or attributes of a gaming object or a user gaming object.

As the parameters of the game are dependent upon the configuration of the device 10, upgrading or augmenting the configuration of the device for example by changing the device 10 or adding additional accessory devices, will upgrade or augment the parameters of the game.

The accessory device may be an accessory that is primarily or only for augmenting the parameters of the game. Alternatively, the accessory may primarily be an accessory for augmenting the functionality of the electronic device 10 that additionally augments the parameters of the game e.g. a camera module, a headset, a pen input device etc.

When a new accessory is added to the device 10, then a new gaming object may appear in the game. The new gaming object may be a gaming object that is obtainable during normal game play or it may be a gaming object that is obtainable only by augmenting the parameters of the game via the configuration of the device. The gaming object may resemble the accessory that is connected to the electronic device 10 to augment the device configuration. For example, if the accessory device is an amulet, necklace, bracelet, ring etc, then the augmented parameters of the game may cause the user gaming object to wear a gaming object, such as amulet, necklace, bracelet, ring etc, corresponding to the respective accessory within the game.

In one example, the accessory e.g. an amulet results in a gaming object appearing on the user gaming object. The accessory may be modified by for example downloading an image for display by the accessory. An attribute associated with the gaming object is dependent upon the image displayed. Thus if a cruciform picture is displayed, the user gaming object wearing the gaming object in the game may have the power to banish undeads. A user may be able to select which one of a plurality of different images are displayed by the accessory and consequently which one of a plurality of attributes the user gaming object has. The appearance of the gaming object in the game may change as its associated attribute changes. Typically it may resemble the picture displayed. The user may be able to purchase new images for the amulet and consequently new attributes for the user gaming object. In this embodiment, the connection of the accessory creates a new device configuration and changing the image displayed in the accessory changes the accessory and hence changes the device configuration.

If the device 10 is upgraded to a more recent model, or one or more accessories are connected to the device, then gaming objects may be introduced into the game and/or the attributes of the user gaming object or gaming object(s) may be improved. There is therefore an incentive for a user of the device to upgrade the device 10 and to purchase accessories, as to do so will enhance the game playing experience by affecting a quality of the user's participation in the game.

For example, if the electronic device 10 has a color display then the user gaming object may, for example, have protection against bright light. If the electronic device 10 has a flashlight then the user gaming object may have infra-vision. If the electronic device 10 has a camera then the user gaming object may have a telescope or a map if the electronic device 10 has a vibrating alert then the user gaming object may have a warning, lightning or earthquake skill.

The memory 16 stores a data structure 17, which associates each one of a plurality of device configurations with a particular respective set of game parameters. As described above, these parameters may, for example, affect the attributes of a user gaming object, affect the attributes of a gaming object and introduce gaming objects into the game. The set of game parameters associated with a physical device configuration may be referred to as a game configuration.

The data structure 17 may be updated via messages received through the cellular radio transceiver 24. Updating the data structure enables the game configuration associated with a particular device configuration to be updated. This may be used, for example, to introduce a new accessory device. A new device configuration is introduced for the new accessory along with an associated new game configuration. If the user purchases the new accessory and connects it to the device 10, then the new game configuration will be loaded into the game. That is the set of game parameters specified by the new game configuration will be used at the next instantiation of the game or the next session of the game. The updating of the data structure 17 also allows the game configuration associated with a particular device configuration to be varied over time. Typically, the game configuration will be deflated over time. That is the set of gaming parameters is changed over time to become less desirable to use. This variability of the game configurations allows the best game configurations to be always associated with the newest device configurations. As a device configuration ages, its game configuration can be changed to be less desirable. This creates an incentive for a user to buy a new accessory or device model.

The game configurations defined in the data structure 17, may be obtained in some embodiments through normal game play. That is, the game configuration which might include an attribute of a user gaming object, an attribute of a gaming object and an introduced gaming object as defined by the set of game parameters for that game configuration, may arise during normal game play. As the game configuration associated with a device configuration is loaded at the instantiation of a game, it provides a 'head-start' in this instance.

The game configuration arising from a particular device configuration may come into effect immediately, whenever the device configuration changes or it may require an additional trigger event, such as the selection of an option by the user of the device 10 or the completion of a task within a game.

The game configuration preferably enhances a user's game playing experience, but it is also possible for it to have a neutral or negative effect. The effect caused by the game configuration may be dependent upon the game being played.

The consequences of a game configuration, such as the introduction of a gaming object or an attribute, may be fully/partially explicit/latent if a consequence is explicit, then the gaming object or attribute associated with that consequence are always present. If a consequence is latent, then the gaming object or attribute associated with that consequence are not always present, but can be turned on (and possibly off) by the user taking some action with the electronic device 10 or the user gaming object performing some task within the game. For example, if the user switches the phone light on, then a gaming object, such as a torch, may be illuminated in the game.

The method of controlling the game is further described with reference to FIG. 2. At step 40, the gaming device 10 identifies its current device configuration. This may be achieved in a number of ways.

For example, the memory 16 may store an identifier identifying the model of the device 10. The configuration of the device 10 may consequently be identified by the processor 12 reading the identifier from the memory 16.

If the accessories 30, 32 are Bluetooth® enabled then the processor 12 can use the Bluetooth "Class of Device" to identify an accessory. The Class of Device indicates the capabilities of a Bluetooth device and can be obtained using the Device Discovery procedure. The Class of Device of the connected accessories is used by the processor 12 to further define the device configuration.

Alternatively, each accessory 30, 32 may have an associated accessory code that can be stored in the memory 16. This accessory code may be transferred from the accessory itself by any suitable means. Alternatively the accessory code may be obtained from the accessory manufacturer and input into the device by the user. In this case, there is preferably some security mechanism attached to the accessory code that prevents it being re-used by other users. For example, the data provided to the user by the accessory manufacturer may, for example, be a combination of the accessory code and a code uniquely identifying the user or device such as the IMEI, IMSI or telephone number. The device can use the device code to recover the accessory code from the combination. For example, the combination may be obtained by exclusive ORing the accessory code and the identifying code. The identifying code may be obtained via a user registration process. The combination is then provided to the device, which exclusively ORs the combination with the device code to recover the accessory code. The accessory code is not made available to the user but is stored in the memory. Another device, with a different device code, could not recover a valid accessory code. This allows the invention to be used with accessories that are already in existence. The stored accessory codes are used by the processor 12 to further define the device configuration.

The processor 12 then uses the identified current device configuration to query the data structure 17, which is preferably organized as a database. The database returns at step 42 the game configuration associated with the current device configuration. This game configuration is a set of game parameters. At step 44, these game parameters are loaded into the game thereby setting the parameters of the game to include those of the current game configuration.

It should be appreciated that a game configuration may be composed from a plurality of game parameter sets, where each set is associated with an entry in the data structure. This may arise when the device 10 has a number of accessories. One set of game parameters may be associated with the device in the data structure, whereas another set of parameters may be associated with each accessory device. The current device configuration includes the device and the accessory or accessories and the game configuration is the union of the sets of game parameters.

The effect of adding accessories may not necessarily be a linear combination of parameter sets. In other implementations, specific combinations of a device and accessory or specific combinations of accessories may have particular parameter sets that are not merely the union of two sets. This enables there to be an interaction between accessories and prevents the result of the addition of an accessory or of an upgrade to the device being entirely predictable. For example some games may require several accessories before a user gaming object gets access to some attribute or gaming object within the game. Also in multiplayer games several players' device configurations may interact and affect to the game somehow. For example if two players have too strong a device configurations and are near each other (physically or in the game) there may be a reaction e.g. an earthquake may happen within the game which is simulated in the devices using a vibrating alert.

Figure 2:
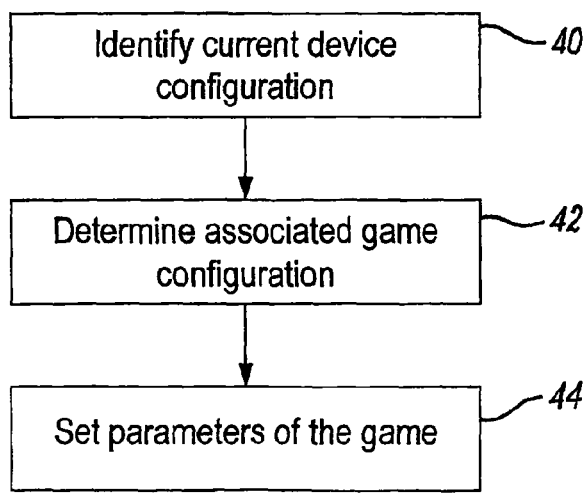
FIG. 2 illustrates a method for controlling a game.

The method of controlling the game illustrated in FIG. 2 may occur when a game is started or a new game session is started or whenever a new accessory device is connected to the gaming device 10, during a game. If the parameters are updated during a game, they may have effect immediately or may, depending upon the game design, have effect after some user action In some circumstances, it may be appropriate to provide the user with a choice as to which of the game parameters defined by the game configuration should be loaded into the game.

It may also be desirable for the game to have a memory of previous device configurations and associated game configurations and allow a user to pick and choose parameters from the different game configurations. This would encourage the collection of devices and accessories.

It may also be desirable for a user to be able to export to another user the credit associated with a particular accessory or to export to another user a particular consequence of their device configuration such as a gaming object, or an attribute of a gaming object or user gaming object. The export may be temporary or permanent and may be part of an exchange with the other user.

Figure 3:
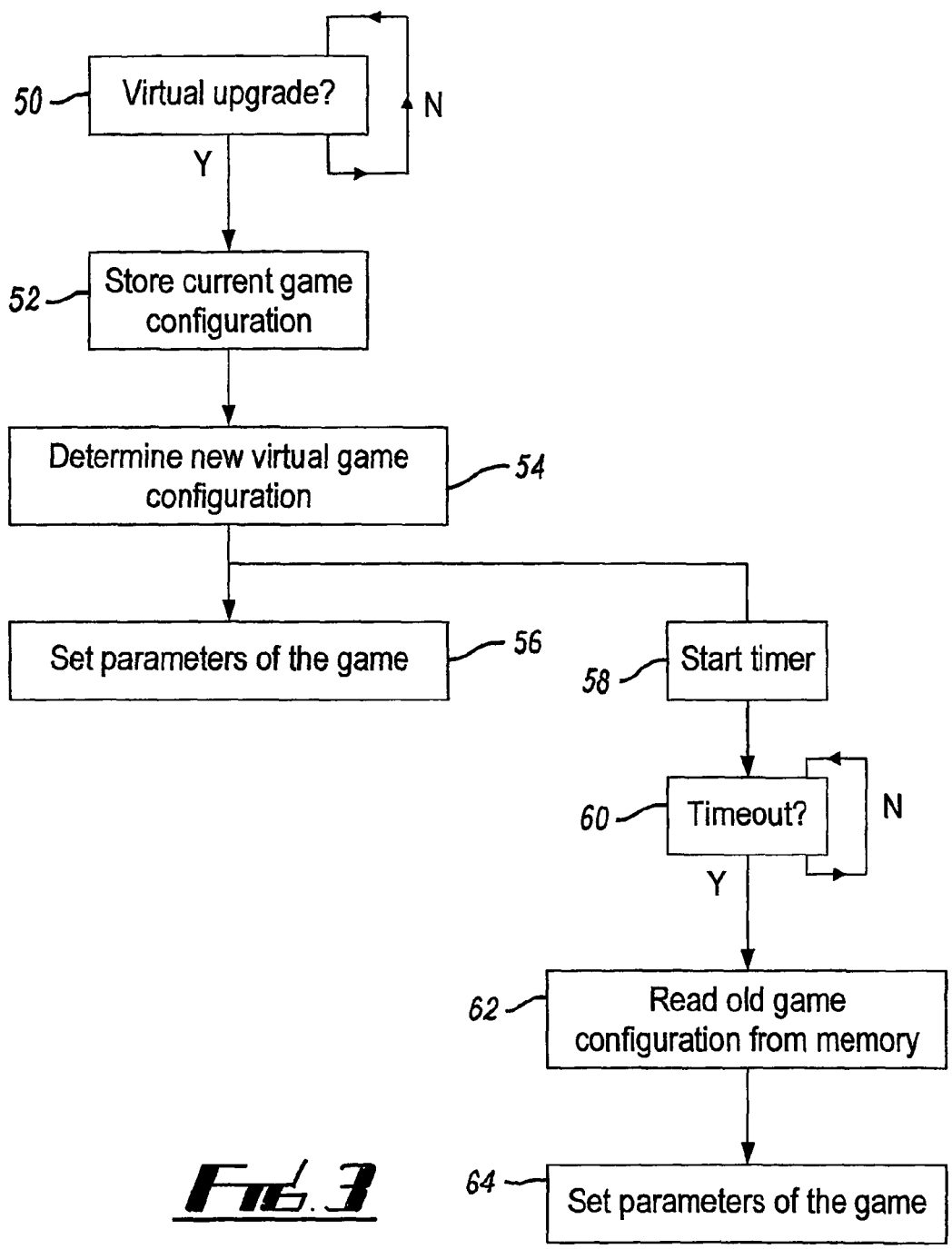
FIG. 3 illustrates a method for trialing a device configuration.

It may also be desirable to allow a user to test a new device configuration before purchase. As illustrated in FIG. 3 an option is provided at step 50 for the user to virtually upgrade device 10 or add an accessory device. If the user accepts the option, the processor 12 at step 52, stores the current game configuration to memory and then at step 54 determines a new virtual game configuration by querying the data structure 17 with the new virtual device configuration. This virtual game configuration is loaded into the game at step 56 and a timer is simultaneously started at step 58. When the timer times out after a predetermined period at step 60, the processor reads the stored game configuration from memory at step 62 and reloads it into the game at step 64. The user is therefore able to trial the effects of a changes in the device configuration, on the game configuration.

Although the invention has been described in relation to a stand alone gaming device it should be appreciated that it is also applicable to a gaming device which is a client to a remote gaming server. Such arrangements are common for multi-user games for which this invention is particularly applicable.

Figure 4:
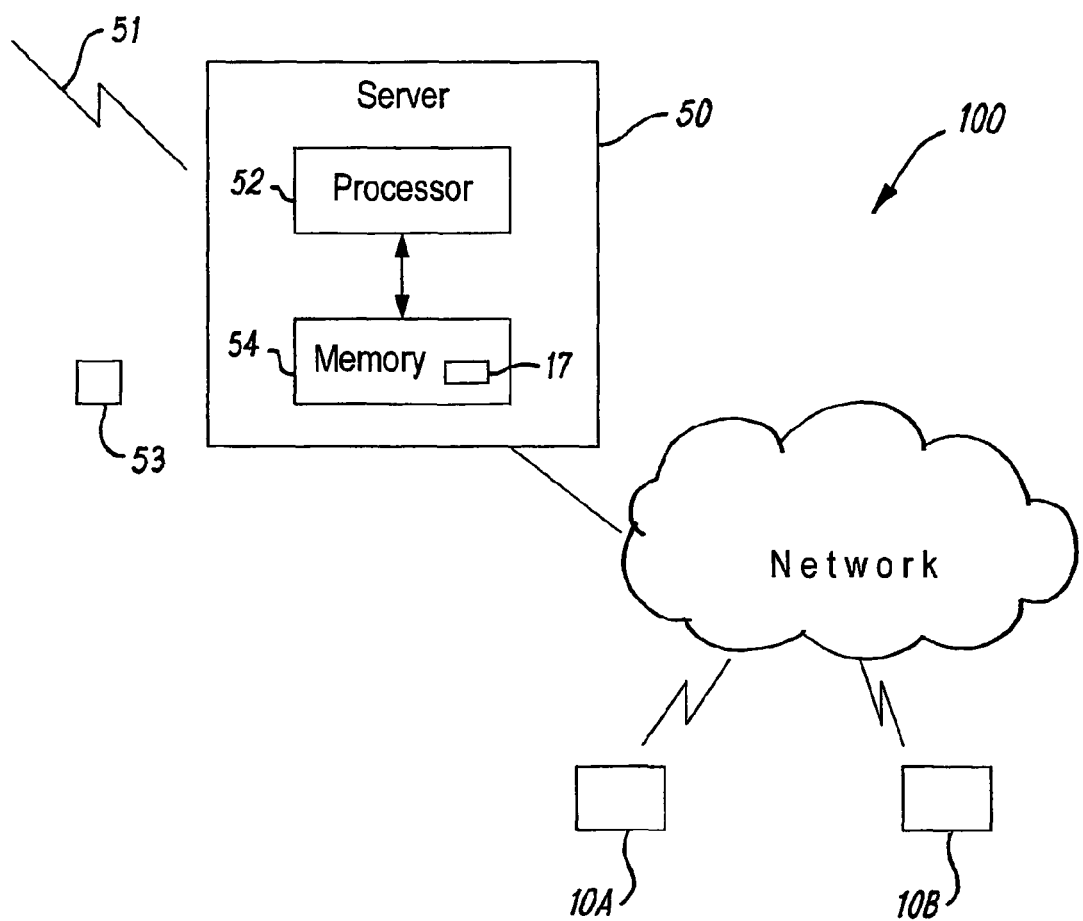
FIG. 4 illustrates a system for playing and controlling a game.

FIG. 4 illustrates a further implementation of the invention, in which remote gaming devices 10A and 10B are operable to play a game on the gaming server 50 by communicating via the network 60, e.g. cellular mobile telephone or broad based network such as Internet. The gaming server may enable each of the gaming devices 10A and 10B to play, as clients to the gaming server 50, different games or different instantiations of the same game. The gaming server may also enable a multi-user game in which both the gaming devices 10A and 10B participate concurrently in the same game.

The server 50 comprises a processor 52 and a memory 54 that stores a data structure 17 for the game that is currently being played remotely via the gaming device 10A. The memory 54 stores computer program instructions that control the operation of the server 50 when loaded into the processor 52. The memory 54 may be any suitable type of memory. The memory 54 includes computer program instructions for one or more games, which when loaded into the processor 52 enable multiple users to interact with the server 50 and play the game(s). The computer program instructions may arrive at the server 50 via an electromagnetic carrier signal 51 or be copied from a physical entity 53 such as a computer program product, a memory device or a record medium such as a CD-ROM or DVD.

The server 50 controls the game configuration of each of the client devices. It updates the game configuration of a client device when the device configuration for that client device is updated.

At step 40 of FIG. 2, the client device 10A identifies its current device configuration and sends a message to the server including information identifying the device configuration and information identifying the user of the device. The identification of the device configuration may be achieved in a number of ways as described above with reference to the preceding paragraphs.

The processor 52, of the server 50, then uses the identified current device configuration to query the data structure 17, which is preferably organized as a database. The database returns at step 42 the game configuration associated with the current device configuration. This game configuration is a set of game parameters. At step 44, these game parameters are associated with the user of the client device 10A and loaded into the game thereby setting, for that user, the parameters of the game to include those of the current game configuration.

Although embodiments of the present invention have been described in the preceding paragraphs with reference to various examples, it should be appreciated that modifications to the examples given can be made without departing from the scope of the invention as claimed For example, in the embodiment described with reference to FIG. 1, the data structure 17 is stored locally in the device 10. In other embodiments, the data structure 17 may be stored in a remote server as illustrated in FIG. 4. In this scenario, the device 10 would query the remote database by sending a message that identifies the device configuration and would receive a message in reply including the set of parameters defining the appropriate game configuration.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An electronic device comprising:
   at least one processor; and
   at least one memory including computer program code for one or more programs,
   the at least one memory and the computer program code configured to, with the at least one processor, cause the electronic device to perform at least the following,
   determine, based upon a data structure stored in the at least one memory, an association between a device configuration of the electronic device from a plurality of device configurations with a respective game configuration, the game configuration specifying one or more parameters of a game;
   identify a current device configuration for the electronic device;
   determine a current game configuration associated with the current device configuration;
   detect an accessory device and a model of the accessory device;
   modify the current device configuration based, at least in part, on the detection;

decrease one or more parameters of the game configuration over time, in response to a determination that a new model of the accessory device is available; and
control the game by setting one or more parameters in the game as specified by the modified current game configuration.

2. An electronic device as claimed in claim 1, wherein the electronic device is further caused to:
present on a user interface of the electronic device an accessory gaming object resembling the accessory device in the game as specified by the modified current game configuration,
wherein the game comprises gaming objects and the current game configuration specifies a parameter that creates a gaming object, and
wherein the accessory device is detected when physically connected to the electronic device.

3. An electronic device as claimed in claim 2, wherein the electronic device is further caused to:
detect one or more other accessory devices;
modify the current device configuration based, at least in part on the detection; and
presenting on the user interface of the electronic device an interaction effect between the accessory device and one or more of the other accessory devices in the game,
wherein the game comprises at least one user gaming object and the created gaming object affects an attribute of the user gaming object.

4. An electronic device as claimed in claim 2, wherein the control of the game, includes setting parameters in the game as specified by the current game configuration at the instantiation of the game, wherein the electronic device is further caused to:
vary one or more visual attributes of the gaming objects in the game based on user physical manipulation of one or more of the physical device configurations of the electronic device; and
present on the user interface corresponding manipulation of the varied one or more visual attributes in the game.

5. An electronic device as claimed in claim 4, wherein the parameters set at the instantiation of the game are variable while the game is played, and the user physical manipulation includes switching on or off a light of the electronic device to switch on or off an illuminating gaming object in the game.

6. An electronic device as claimed in claim 1, wherein the game comprises a user gaming object, and the game configuration specifies a parameter that affects an attribute of the gaming object or an attribute of the user gaming object.

7. An electronic device as claimed in claim 6, wherein the electronic device is further caused to:
receive selection input; and
select a sub-set of the parameters specified in the current game configuration for use as parameters in the game,
wherein the accessory gaming object is presented on the user interface as worn by the user gaming object.

8. An electronic device as claimed in claim 7, wherein the electronic device is further caused to:
add one or more new attributes of the user gaming object, one or more new gaming objects available to the user gaming object, or a combination thereof, in the game based, at least in part on one or more attributes of the accessory device in a physical world.

9. An electronic device as claimed in claim 8, wherein the accessory device includes a camera, a headset, a pen input device, a light, or a combination thereof,
the one or more new attributes of the user gaming object includes one or more capabilities of light protection, infra-vision, lightning-generating, earthquake-generating, or a combination thereof, and
the one or more new gaming objects include one or more telescopes, one or more maps, or a combination thereof.

10. An electronic device as claimed in claim 1, wherein the electronic device is further caused to:
detect one or more other electronic devices in proximity of the electronic device;
present on the user interface of the electronic device an interaction effect in the game based, at least in part on the detection; and
control the game by setting parameters in the game as specified by one or more previous game configurations.

11. An electronic device as claimed in claim 1, wherein the electronic device is further caused to:
temporarily control the game by setting parameters in the game as specified by a virtual game configuration associated with a virtual device configuration selected by the user.

12. An electronic device as claimed in claim 1, wherein the electronic device has one or more hardware components corresponding to the device configurations, and the one or more hardware capabilities of the electronic device are based, at least in part, the accessory device.

13. An electronic device as claimed in claim 1, wherein the electronic device is further caused to:
download an accessory image; and
modify the presentation of the accessory gaming object based, at least in part on the accessory image.

14. An electronic device as claimed in claim 1, wherein the electronic device is further caused to:
further decrease the one or more parameters of the game configuration over time, in response to a determination that a new model of the electronic device is available.

15. An electronic device as claimed in claim 14, wherein the electronic device is further caused to:
receive an update message via a wireless interface, wherein the update message specifies that the new model of the accessory device is available.

16. An electronic device as claimed in claim 1, wherein the electronic device has one or more hardware components corresponding to the device configurations, and the one or more hardware components include an electronic display, a capturing device, a haptic feedback device, or a combination thereof.

17. A method comprising:
determining by an electronic device, based upon a data structure stored in the at least one memory, an association between a device configuration of the electronic device from a plurality of device configurations with a respective game configuration, the game configuration specifying one or more parameters of a game;
identifying by the electronic device a current device configuration for the electronic device;
determining by the electronic device a current game configuration associated with the current device configuration;
detecting by the electronic device an accessory device and a model of the accessory device;
modifying by the electronic device the current device configuration based, at least in part, on the detection;
decreasing by the electronic device one or more parameters of the game configuration over time, in response to a determination that a new model of the accessory device is available; and controlling the game by the electronic device by setting one or more parameters in the game as specified by the modified current game configuration.

18. A method of claim 17, wherein the electronic device has one or more hardware components corresponding to the device configurations, and the one or more hardware components include an electronic display, a capturing device, a haptic feedback device, or a combination thereof.

* * * * *